Figure 12:
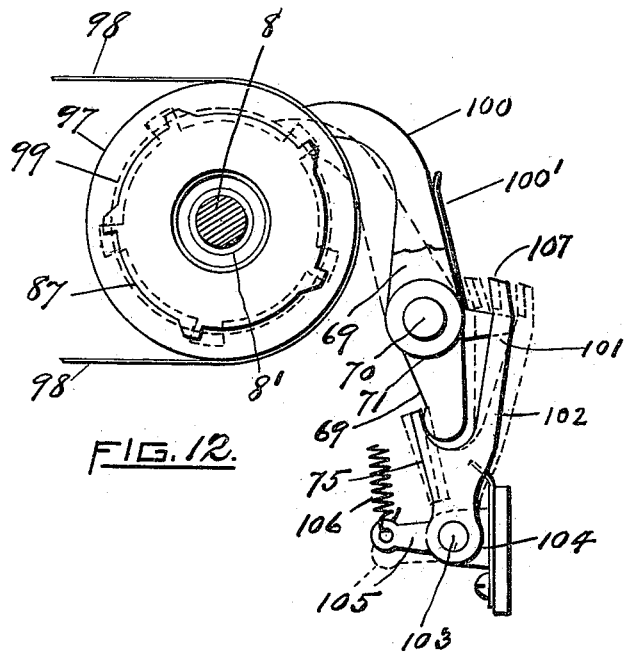

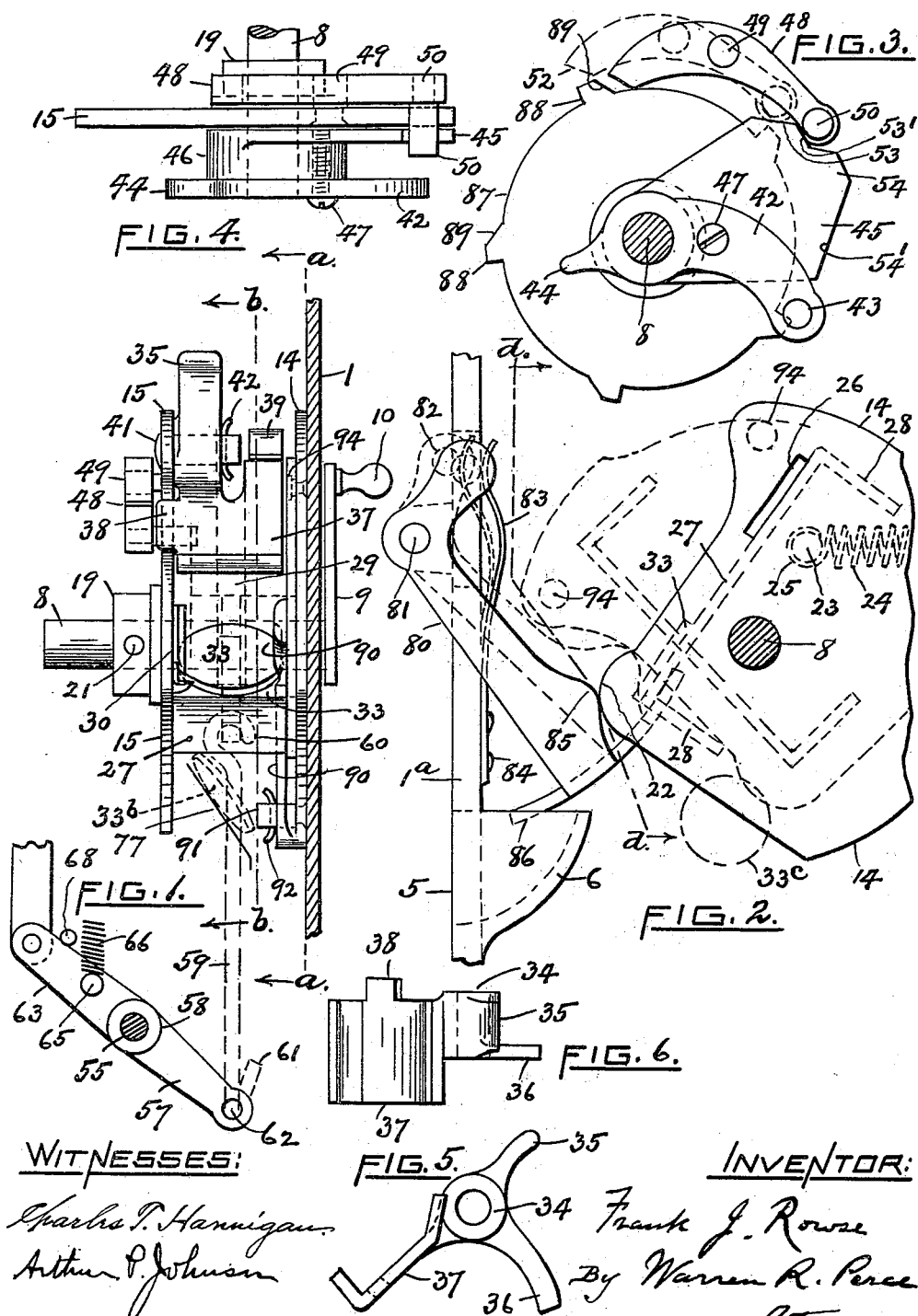

F. J. ROWSE.
COIN ACTUATED MECHANISM.
APPLICATION FILED DEC. 14, 1909.
992,258.
Patented May 16, 1911.
4 SHEETS—SHEET 2.
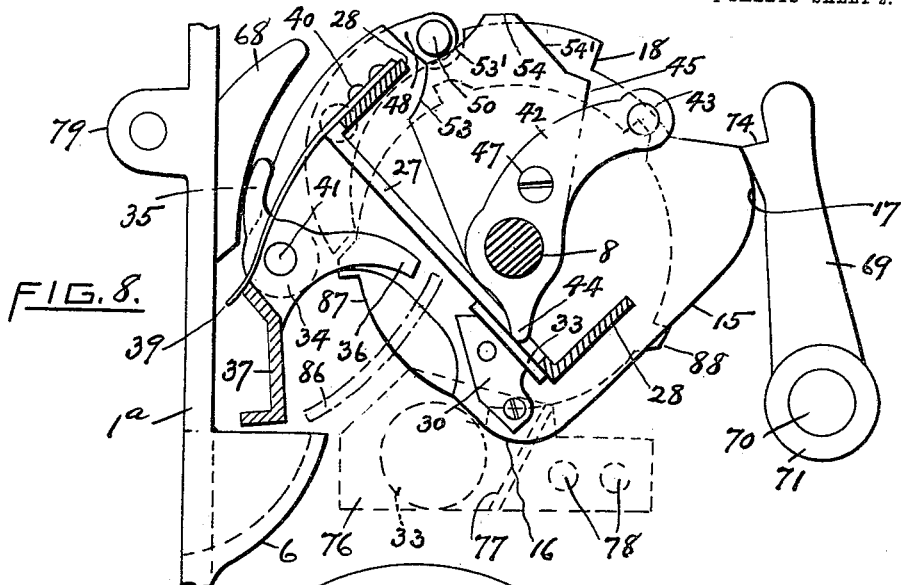
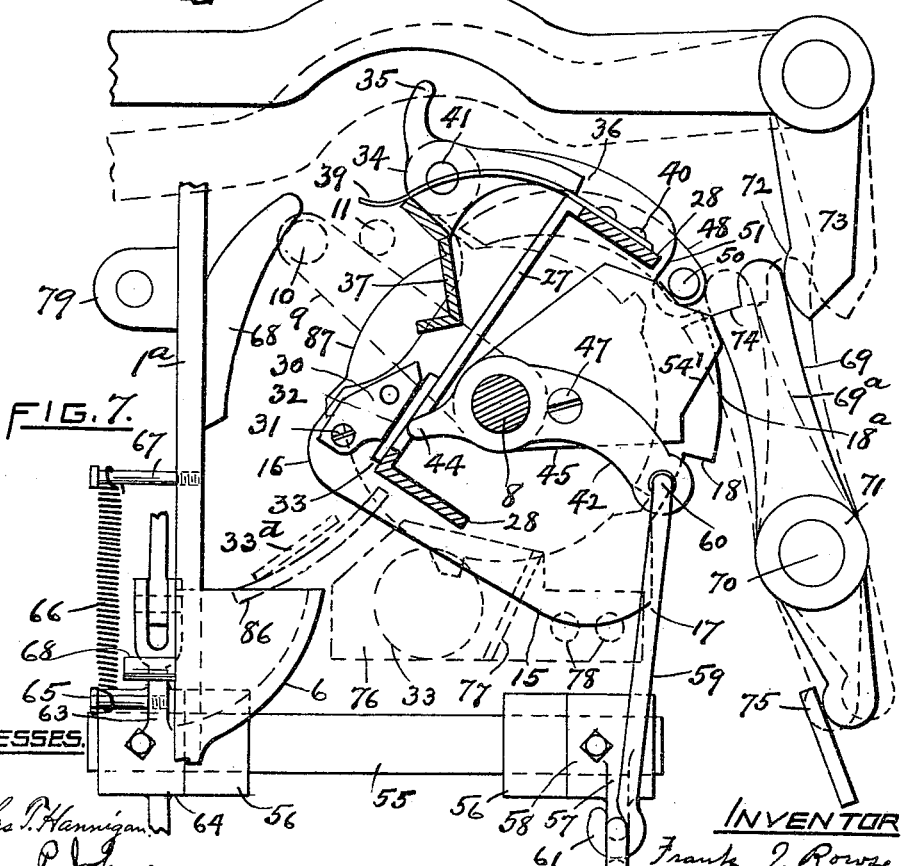

F. J. ROWSE.
COIN ACTUATED MECHANISM.
APPLICATION FILED DEC. 14, 1909.
992,258.
Patented May 16, 1911.
4 SHEETS—SHEET 3.
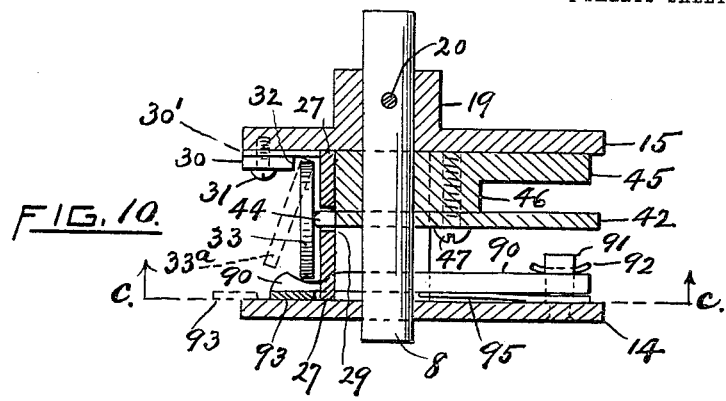
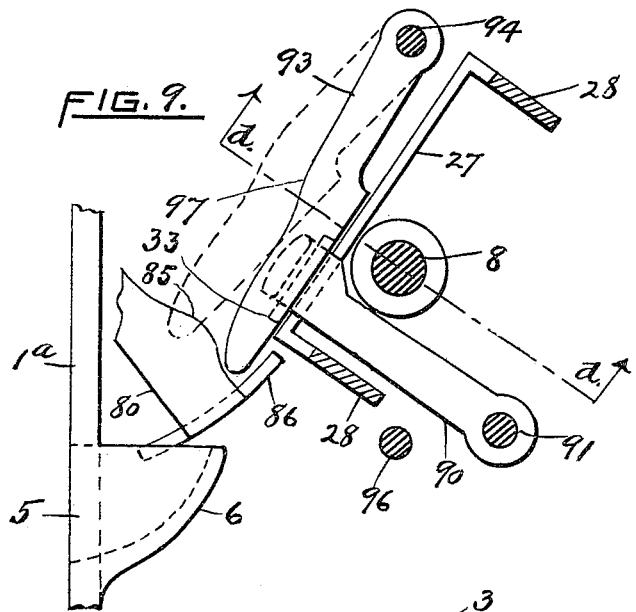
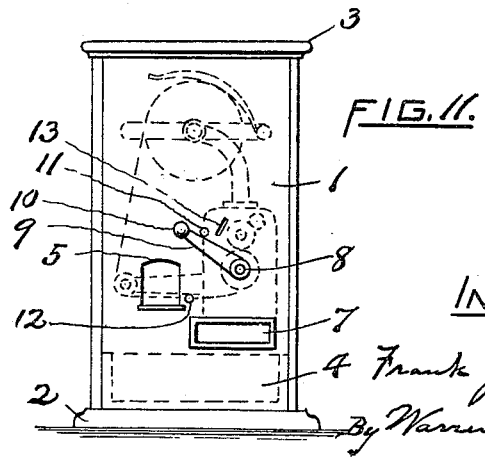
WITNESSES:
Charles T. Hannigan
Arthur P. Johnson
INVENTOR:
Frank J. Rowse
By Warren R. Perce
Attorney

F. J. ROWSE.
COIN ACTUATED MECHANISM.
APPLICATION FILED DEC. 14, 1909.

992,258.

Patented May 16, 1911.

4 SHEETS—SHEET 4.

WITNESSES.
Charles P. Hannigan
Arthur P. Johnson

INVENTOR.
Frank J. Rowse
By Warren R. Perce
Attorney.

UNITED STATES PATENT OFFICE.

FRANK J. ROWSE, OF PAWTUCKET, RHODE ISLAND.

COIN-ACTUATED MECHANISM.

992,258. Specification of Letters Patent. Patented May 16, 1911.

Application filed December 14, 1909. Serial No. 533,069.

*To all whom it may concern:*

Be it known that I, FRANK J. ROWSE, a citizen of the United States, residing at Pawtucket, in the county of Providence and State of Rhode Island, have invented certain new and useful Improvements in Coin-Actuated Mechanism, of which the following is a specification, reference being had therein to the accompanying drawings.

Like reference numerals indicate like parts.

Figure 13:
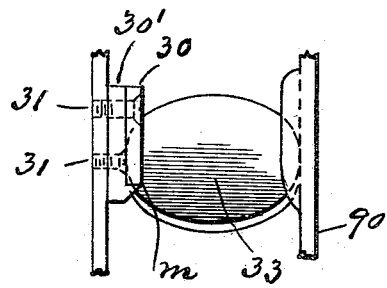

Figure 1 is a front elevation of my improved coil-controlled mechanism as seen on line $d\ d$ of Fig. 2. Fig. 2 is a side elevation of the same as seen on line $a\ a$ of Fig. 1. Fig. 3 is a side elevation of the coin-presser, cam-plate and pawl, together with the ratchet wheel of a feed roller, which is rotatable by said pawl. Fig. 4 is a top plan view of said coin-presser, cam-plate and pawl. Fig. 5 is a side elevation of the clearer, constituting an element in my said device. Fig. 6 is a top plan view of said clearer. Fig. 7 is a view of my improved coin-controlled mechanism as seen in side elevation on line $b\ b$ of Fig. 1, when the machine is in its normal position, before operation, but with a coin in place therein to enable operation of the machine. Fig. 8 is a view similar to that shown in Fig. 7, but as seen at the end of the operation, with the coin about to be discharged therefrom. Fig. 9 is a view in side elevation of the parts of the device seen on line $c\ c$ of Fig. 10, comprising a temporary coin-locking mechanism. Fig. 10 is a view in top plan of the parts seen on line $d\ d$ of Fig. 9. Fig. 11 is a view in front elevation (on a reduced scale) of the cabinet or case, which contains the said coin-controlled mechanism. Fig. 12 is a view in elevation of automatic means for closing the coin slot. Fig. 13 is a detail view on a much enlarged scale.

My invention relates to coin-controlled mechanism of that class in which a coin, while in position therein, becomes an element or part of the device to operate the same; and it consists of the novel construction and combination of the several parts as hereinafter described and claimed.

The cabinet or case, represented in Fig. 11 has a front plate 1 and a base 2 and a cover 3. A drawer 4 is indicated by dotted lines and is mounted slidably on the base 2. There is an opening or aperture 5 through the front plate, and a receptacle 6, having an open top, extends rearwardly from the aperture 5 and registers therewith, as shown in Fig. 9. There is also a window 7 in the front plate of the cabinet, and it is provided with a glass, so as to disclose the coin which may be temporarily passing there, as hereinafter described. A crank shaft 8 is mounted in suitable bearings within the cabinet, and one end thereof projects out through the front plate, as seen in Fig. 11. A crank or lever 9 is fastened on the shaft 8 and has a handle 10. The movement of the crank 9 is limited by the stop pins 11 and 12, which project from the front plate of the cabinet. A coin slot 13 is also made in said front plate, through which a coin may be inserted to operate the machine.

The coin-carrier is mounted fast on the shaft 8 and therefore turns with it, having an oscillatory movement therewith, limited by the stop pins 11 and 12, with which alternately the crank 9 comes in contact. The coin-carrier comprises two side plates 14 and 15, the side plate 14 moving slidingly on the rear surface of the front plate 1 of the cabinet, as seen in Fig. 1, and the side plate 15 being parallel with the side plate 14, as there illustrated. The side-plate 15 is also a cam-plate, being provided with a cam-edge, as indicated at 16, a second cam-edge, as shown at 17, and a locking shoulder or stop, as shown at 18 in Fig. 7. The side-plate 15 of the coin-carrier has a hub 19, and a set screw 20, passing through the hole 21 in the hub 19 fastens the side-plate 15 upon the shaft 8, as shown in Fig. 1. The side-plate 14 has a cam-edge 22. It also has a stud 23, upon which is supported a spiral spring 24 by means of a coil 25 thereof, surrounding the stud 23. The opposite end of the spring 24 is secured to the front plate 1 by a pin (not shown). The function of the spring 24 is to give automatic return movement to the coin-carrier and crank, when the operator releases his hold upon the crank handle 10. A coin-slot 26 is made through the side plate 14, and is continuous with the coin-slot 13 of the front plate 1, when the coin-carrier is in its normal position. As soon, however, as the coin-carrier oscillates from its normal position, the side-plate 14 covers the coin slot 13, and so closes it against the introduction of another coin.

A coin-plate 27 has two bent ends 28, which are fastened, respectively, to the side-plates 14 and 15 by screws, or otherwise. The coin-plate 27 has a central longitudinal slot 29, shown in dotted lines in Fig. 1. This slot 29 is also indicated by those parts which are not cross-hatched, as represented at 27 in Figs. 7, 8 and 9, where such parts show the edge of said slot of the coin-plate. A pressure-plate 30 is fixed upon the side-plate 15 by screws 31, and its straight edge 32 is parallel to the adjacent surface of the coin-plate 27 at a distance just equal to the thickness of the coin 33, as seen in Fig. 7. As shown on a much enlarged scale in Fig. 13, this pressure-plate 30 is made in two parts, fastened together by screws 31. The inner plate is there designated as 30' and has a bent projection or lip $m$, which underlies the coin just below the horizontal diametrical line thereof, as represented in Fig. 13.

A coin-clearer is separately shown in Figs. 5 and 6, and in combination with the co-operating parts of the machine in Figs. 1, 7 and 8. It consists of a tubular hub 34, a tripping lever 35, a toe 36, and a coin-guide or guard 37. The coin-guide or guard 37 has a projection or lip 38, which extends over the edge of the side-plate 15, as illustrated in Fig. 1. A flat spring 39 is secured at one end by screws 40 to the upper bent end 28 of the coin-plate 27, and its opposite free end rests forcibly on the upper bent edge of the coin-guide or guard 27. The coin-clearer is rotatably mounted loosely on the headed stud or pin 41, which is fastened on the side-plate 15, and a cotter pin 42 passes through the inner end of the stud 41.

A coin-presser or lever 42 has a circular enlargement 43, which has a central bore to receive the shaft 8. The presser or lever 42 is loosely mounted on the shaft 8. It has its long arm slightly curved, which is provided at its outer extremity with an eye or aperture 43. The short arm of the presser or lever 42 is a toe 44. A cam plate 45 has a hub 46 with a tubular bore, by which it is loosely mounted on the shaft 8 and a screw 47 fastens the coin-presser or lever 42 to the cam-plate 45, so that they move together. The toe 44 of the coin presser or lever 42 moves freely through the slot 29 of the coin-plate 27, as seen in Figs. 7, 8 and 10.

A feed pawl 48 is mounted loosely on a stud 49, which projects from the side plate 15. On the rearward end of the pawl 48 is a stud 50, which normally rests in a socket 51 made for its reception in the edge of the side-plate 15, as best seen in Fig. 7. The feed pawl 48 has its forward end beveled, as best seen at 52 in Fig. 3. The cam-plate 45 has the working edges 53, 53', 54, 54', as best seen in Fig. 3.

A rock shaft 55 is loosely mounted in bearings 56. A lever arm 57 has a tubular hub 58 and is mounted thereby on the shaft 55, said hub being fastened on the shaft by a set screw, or otherwise. A link bar 59 terminates at its upper end in a hook 60, which engages in the eye 43 of the coin-presser or lever 42, and it terminates at its lower end in a hook 61, which engages with an eye 62 at the outer end of the lever arm 57. On the rock shaft 55 another lever arm 63 is mounted by its tubular hub 64. The hub 64 is secured upon the rock shaft 55 by a screw, or otherwise. The lever arm 63 has a stud 65, on which is secured one end of a spiral spring 66. The opposite end of the spring 66 is secured to a stud 67, which projects from a side wall or plate $1^a$ of the frame of the machine. A stop pin 68 from said side plate $1^a$ limits the upward movement of the lever arm 63, as seen in Fig. 1.

A fixed cam-plate 68 projects from the side wall or plate $1^a$ of the machine and has a concave working edge.

A locking lever 69 is mounted loosely on the shaft 70, by its hubs 71. The upper end of the locking lever 69 is rounded and serves as a cam, as illustrated in Fig. 7. It normally rests against the edge 54 of the cam plate 45, as seen in Fig. 7 in solid lines, with its opposite side in contact with the cam-edge 72 of a bent lever 73, which is connected with and operates mechanism, not forming any part of this coin-controlled device, but connected with a machine to which this coin-controlled device is applicable. When the cam-edge 17 of the side-plate 15 comes into the position illustrated in Fig. 8, it moves the locking lever 69 outward, and gives a movement to the bent lever 73, as represented by dotted lines in Fig. 7. When by the oscillation of the coin-carrier the shoulder or notch 18 of the side-plate 15 comes into position to receive the shoulder 74 of the locking lever 69, said lever locks the side-plate 15 against return movement by the engagement of said shoulders 18 and 74 with each other. Such engagement, as also the forcible cam-contact of the lever 69 with the tail of the pawl 48 and the cam edge 72 of the bent lever 73, is caused by a spring-pressed bearing plate 75, which presses against the tail end of the lever 69. This bearing plate 75 and its spring and connected parts are shown in Fig. 12.

A coin-guide plate or partition 76 has an incline 77 and is fastened by screws 78 to the front plate of the machine.

The side wall or plate $1^a$ of the machine frame has the ear piece 79, to which is mounted by means of a pivot 81 the conveyer 80 for the removal of bogus coins or slugs, which may be inserted in the machine. The upper end of the conveyer 80 is bent and rounded, as illustrated in Fig. 2. This end has a stud 82. A flat spring 83 is fastened by screws 84 to the side wall or plate $1^a$ and its free end bears against the stud 82. The conveyer arm has a cam-edge 85 adapted to coöperate with the cam-edge 22 of the side-plate 14, as illustrated in Fig. 2. A curved plate 86 is secured to the lower end of the conveyer arm 80.

On the shaft 8 is loosely mounted a sleeve 8′, on which is loosely mounted a feed roller 97, which is provided with a ratchet wheel 87, best seen in Fig. 3. Each ratchet tooth 88 has a beveled face 89, with which the beveled face 52 of the feed pawl 48 coöperates.

In Fig. 9 is shown a coin-holding lever 90, pivotally mounted at one end on the stud 91 from the side-plate 14, and held on said stud by a cotter pin 92, or otherwise. This lever 90 at its free end has a curved and beveled coin-rest, as best seen in Fig. 10, at the left thereof. A key piece or lever 93, pivotally mounted on a stud 94, from the side plate 14 is capable of an oscillatory movement to a position between the lever 90 and the side-plate 14, as indicated in Figs. 9 and 10. A spring 95 underlying the lever 90 normally keeps it in the position shown in Fig. 10. A tripping pin or stud 96 from the front-plate 1 extends in the path of the key lever 93 (as the coin-carrier oscillates) to disengage the key lever 93 from the coin-holding lever 90, as illustrated in Fig. 10, when the coin-carrier has nearly accomplished its oscillation.

A strip of paper 98 passes over the roller 97. The roller 97 is circumferentially grooved, as indicated by the dotted line 99 in Fig. 12. A lever arm 100 is loosely mounted on the stud 70, next to the locking lever 69 (which in Fig. 12 is shown as broken away to give a view of the lever arm 100). Its free end rests lightly on the paper strip 98. When the paper strip 98 is exhausted or run off, the free end of the lever arm 100 is adapted to drop into the circumferential groove 99 of the feed roller 97. The lever arm 100 has at its lower end a toe or bunter 101, integral therewith, bent at a right angle.

A rocker arm 102 is pivotally mounted loosely on a stud or shaft 103, and has the bearing plate 75. From the tubular hub 104 of the rocker arm 102 an arm 105 extends, and a spring 106, having one end secured to a fixed support (not shown), is fastened at its opposite end to the extremity of the arm 105. The spring 106 serves to press the plate 75 forcibly against the tail end of the locking lever 69. The upper end of rocker arm 102 is longitudinally slotted and the slot is closed by a cross piece 107 at the top, as indicated by dotted lines in Fig. 12.

The operation of my improved coin-mechanism is as follows: Supposing the machine is adapted to operate with a particular kind of coin, only. The parts, being in the inoperative or normal position illustrated in Figs. 11 and 7, are put into a working condition by means of a coin 33, which is inserted through the coin-slot 13. The coin passes also through the coin-slot 26 of the side-plate 14, and is received upon the coin-plate 27. As the coin-plate 27 is normally in the angular position represented in Figs. 2, 7 and 9, the coin slides by its gravity down along the inclined coin-plate 27, until it comes into the position shown in Figs. 1, 7, 9 and 10. The coin comes to a state of rest, being prevented from further movement by the pressure-plate 30, 30′, and the projection m, and also by the concaved seat of the coin-holding lever, as represented in Fig. 10, but particularly in Fig. 13. The machine is now ready to be operated. The crank arm 9 is normally in contact with the stop pin 11 and is held in that position by the spring 24, which is secured at one end to the stud 23 of the side-plate 14 of the coin-carrier, because the crank arm 9 and the side-plate 14 are both fast upon the shaft 8. To operate the machine, the crank arm 9 is moved by the handle 10 until the crank arm comes into contact with the stop pin 12. As soon as the crank arm 9 begins thus to move, the toe 44 of the coin-lever 42 presses the coin 33 into forcible contact with the pressure-plate 30, thus locking the parts together. The coin-carrier is then oscillated by the crank 9, 10, from the position shown in Fig. 7 to the position shown in Fig. 8. The delivery of the coin 33 from the coin-plate 27, and from the coin-holding devices coöperating therewith, is effected as follows. The coin-holding lever 90 is loosely mounted on the stud 91, and is capable of a slight movement at right angles with the side plate 14, being normally held in the position shown in Fig. 10 by force of the spring 95. While the parts are in that position, the coin 33 is securely held in place, because the key piece or lever 93 lies between the holding lever 90 and the side-plate 14 adjacent to the outer end of the holding lever 90, as represented in cross section in solid lines in Fig. 10, and also in elevation in solid lines in Fig. 9. Therefore, the holding lever 90 is held rigidly in the position shown in Fig. 10. But when by the continuing oscillation of the coin-carrier, the free end of the key lever 93 comes into contact with the pin 96, it is then pushed out of engagement with the coin-holding lever 90, to the position indicated by dotted lines in Figs. 9 and 10. Thereupon, the pressure of the toe 44 of the coin-presser or lever 42 pushes the coin 33 outwardly and forces back the coin-holding lever 90, which is now no longer locked by the key piece 93. The coin 33 is therefore released from the coin-holding lever 90 but is pushed along the beveled or curved surface or seat of the free end of the coin-holding lever 90, as illustrated in Fig. 10; from the position shown in solid lines to the position shown in dotted lines and designated in said figure by the reference numeral 33ª. The coin 33, in thus moving, is temporarily detained on one edge thereof by the square corner of the pressure-plate 30 and is thereby turned about 90°, as it is detached, such turning movement being illustrated in dotted lines at 33ª in Fig. 10 and in dotted lines at 33ᵇ in Fig. 1. From this position, the now freely falling coin drops, as indicated by 33ᶜ in Fig. 2, strikes the incline 77, and rolls along the guide plate 76 to the drawer. In the latter part of this movement the coin is visible through the glass of the window 7 of the cabinet. As the mechanism has now completed its work, the crank 9, when the handle 10 thereof is no longer manipulated by the operator, returns automatically to its former position, illustrated in Figs. 1 and 11, by the force of the spring 24, which is then free to act. In such return movement the spring-pressed key lever 93 moves from the position shown in dotted lines in Figs. 9 and 10, to the position shown in solid lines in said figures so that the coin-holding lever 90 is moved back to its normal position, ready to engage the next coin which will be inserted through the coin-slot 13. This is the regular and proper use and movement of the mechanism; but suppose an improper coin is presented to the machine. If the coin or a spurious metallic blank has too great a diameter, it cannot pass through the coin slots 13, 26. If it has too small a diameter, it cannot engage with the projection m of the pressure-plate 30′, and is diverted by the conveyer 80, which I will now describe. This conveyer 80 is kept in the normal position, illustrated in Fig. 2 in dotted lines, by means of the spring 83, and its curved plate 86 is in the position illustrated in dotted lines in Figs. 7 and 9. The improper coin or spurious disk simply slides off from the coin-plate 27 to the curved plate 86 (as represented in dotted lines at 33ᵈ in Fig. 7), and thence the coin passes by its own gravity into the receptacle 6, and through the door 5 of the front plate of the cabinet. As such coin or disk is not retained on the coin-plate 27 for the reasons already stated, the toe 44 of the coin-presser or lever 42 does not engage therewith, and the coin-presser or lever 42, being loose upon the shaft 8, cannot be turned by the crank 9; and as the coin-carrier is oscillated from the position shown in Fig. 7 to the position shown in Fig. 8, the slotted coin-plate 27 allows the toe 44 of the coin-presser or lever 42 to extend inoperatively through the slot 29, without either permitting or enabling the coin-presser 42 or the cam-plate 45 to move at all. The conveyer 80 also has the function to move the key lever 93 into locking position between the side-plate 14 and the coin-holding lever 90. This movement is accomplished by cam-action, the swell 97 on the edge of the key lever 93 being pressed by a cam-edge of the conveyer 80 adjacent to the curved plate 86. The curved plate 86 is slotted longitudinally at its inner end to prevent its contact with the toe 44 of the coin-presser or lever 42. Thus, the conveyer 80 by said cam-action moves the key lever 93 into locking position. At this time, the conveyer 80 is in the position indicated by dotted lines in Fig. 2. The curved plate 86 is moved toward the coin-plate 27 and closes the space there, as illustrated in Fig. 8. Now, suppose that a person puts in through the slots 13, 26, a paper wad, or other obstacle, and then puts in a proper coin. It is evident that in such circumstances the coin could not reach the coin-rests at all. In such case, however, by my machine, the clearer would remove the obstacle, as hereinafter explained, and also the coin, which would be discharged into the receptacle and so returned to the person, who has thus failed to operate the machine. The return movement of the conveyer 80 to its normal position is illustrated in Fig. 2.

In order to remove from the coin-carrier any foreign substance, which may have been inserted into the coin slot 13, and which would prevent or tend to interfere with the proper operation of the machine, there is provided a clearing device. Mischievous persons, in order to prevent or impair the operation of the machine, may insert toothpicks, wads of paper, or other clogging articles or substances, through the coin slots 13, 26, but the clearing device already described, will effectually protect the machine from the consequences of such attempts. The clearer is pivotally mounted on the pin or stud 41, and is pressed by the spring 39, which bears against the upper edge of the coin-guide or guard 37. The clearer is actuated by its tripping lever 35, which, as the coin-carrier oscillates from the position shown in Fig. 7 to the position shown in Fig. 8, comes into contact with the fixed cam-plate 68, and so the clearer is oscillated to the position shown in Fig. 8. Consequently, the toe or lever 36 moves from the position shown in Fig. 7, through the slot 29 of the coin-plate 27, to the position shown in Fig. 8, and so pushes out and removes whatever substance obstructs the passage of the coin. The spring 39 returns the clearer to its normal position shown in Fig. 7.

The return movement of the coin-presser 42 and the cam-plate 45 connected therewith, is accomplished by the spring 66, which, fastened to the pin 67 moves the lever arm 63, which moves the tubular hub 64, thus rocking the shaft 55, the tubular hub 58 and the lever arm 57. This oscillatory movement is communicated by the link bar 59 to the coin-presser or lever 42. The oscillation is limited by the stop pin 68. The spring 66 serves to hold the cam plate 45 and the coin-presser 42 (with its toe 44) in normal position.

The method of closing the coin-slot 13 in order to prevent the operation of the machine, when the limitation of its operation has been reached is explained as follows. The mechanism will continue to work as long as there is a strip of paper 98 passing over the feed roller 97 and thus covering the circumferential groove 99 of said roller. While the paper strip is on the roller and covers said groove, the free end of the lever 100 rests lightly upon the outer surface of the paper strip. At such times the toe or bunter 101 of the lever arm 100 extends loosely through the slot of the rocker arm 102. But as soon as the paper strip 98 is exhausted or runs off, the circumferential groove of the feed roller 97 is no longer covered, and consequently the free end of the lever 100 is forced by the flat spring 100′ into said groove, as represented in dotted lines in Fig. 12. This movement of the lever 100 results in the elevation of the toe or bunter 101 and lifts it into such position that it strikes against the cross piece 107 of the rocker arm 102. Therefore, the locking lever 69 engages with the shoulder 18 of the side-plate 14 of the coin-carrier (see Fig. 7). Thus, the coin-slot 26 of the side-plate 14 of the coin-carrier cannot register with the coin-slot 13 of the front-plate 1 of the cabinet, but said side-plate 14 extends behind the coin-slot 13, and prevents the insertion of a coin therethrough. It is evident that each operative oscillation of the coin-carrier causes the locking lever 69 to move from the position indicated by the dotted lines 69ª in Fig. 7 to the position indicated by solid lines 69 in said figure, and vice versa, when the coin-carrier returns, after operation, to its normal position. But if the abutting of the toe 101 against the cross piece 107 of the rocker arm 102 is caused, as already explained, by the dropping of the lever arm 100 into the groove 99 of the roller 97, the rocker arm 102 cannot make an inward oscillation, and therefore the shoulder 74 of the locking lever 69 cannot move out of engagement with the shoulder or notch 18 of the side plate 15 of the coin-carrier. The result is, as already stated, that the return oscillation of the coin-carrier cannot be accomplished, the crank arm 9 remains in contact with the stop pin 12, and the side-plate 14 covers the inner face of the coin-slot 13.

When the feed pawl 48 is in the position shown in dotted lines in Fig. 3 the stud 50 of said pawl is in contact with the edge 53 of the cam-plate 45. As the cam-plate 45 turns forward, the stud 50 moves up along the cam-edge 53 and then rests upon the cam-edge 53′, as shown in Fig. 3 in solid lines. While the pawl is in this position, its forward beveled edge 52 is moved into contact with the beveled edge 89 of the adjacent tooth 88 of the ratchet wheel 87 and then pushes the said ratchet wheel one-fifth of one revolution ahead. When, however, there is no coin in the coin-carrier, the beveled edge 52 of the feed pawl 48 merely rides up an off the beveled edge 89 of said ratchet tooth 88, and therefore does not advance the ratchet wheel and roller at all. When the cam-plate 45 moves forward, the upper end 74 of the locking lever 69, which in Fig. 7 is seen riding on the cam-edge 54 of the cam-plate 45, moves down along the cam-edge 54′ until it comes to the circular edge 18′ of the side-plate 15 and then moves along said cam edge 18′ until it reaches the locking shoulder 18, whereupon it is forced by the spring 106 into engagement with the locking shoulder or stop 18 of the side-plate 15 of the coin-carrier.

I claim as a novel and useful invention and desire to secure by Letters Patent:—

1. In a coin-controlled mechanism, the combination of an oscillatory shaft; a crank to operate said shaft; means to limit the oscillation of the shaft; a side-plate of a coin-carrier fastened on the shaft; a second-plate of a coin-carrier fastened on the shaft parallel to the first named side-plate; a coin plate having a central longitudinal slot and supported by said two side-plates; a pressure-plate adjacent to the coin-plate near the bottom of said slot and parallel to the coin-plate and adapted to support a coin; a coin-presser lever loosely mounted on the shaft and having a toe which is movable through the slot and adapted to press a coin against the pressure-plate; means for giving to the coin-presser lever an oscillation independent of the oscillation of the coin-carrier; a coin-holding lever adapted to coöperate with said pressure-plate to hold a coin temporarily; and means for discharging said coin from the pressure-plate and coin-holding lever, when the coin-carrier is about to complete its forward oscillation.

2. In a coin-controlled mechanism, the combination of a shaft; means for oscillating the shaft to a limited extent; a coin-carrier comprising two parallel side-plates fastened to the shaft; a coin-plate mounted on said side-plates and having an aperture; coin-holding means adjacent to the coin-plate and coöperating therewith to detain a coin temporarily; a coin-presser lever loosely mounted on the shaft and having a toe movable through said aperture to force a coin into said coin-holding means; devices to give an independent oscillation to the coin-presser lever; and means to discharge the coin as the coin-carrier is about to complete its oscillation.

3. In a coin-controlled mechanism, the combination of an oscillatory coin-carrier, comprising two fixed parallel side-plates; a pressure-plate fastened on one side plate and provided with a short projection adapted to underlie a coin; a spring-pressed coin-holding lever mounted on the other side-plate and normally parallel to the pressure-bar and provided with a concaved seat adapted to receive a coin, the distance between which projection and said concaved seat is somewhat less horizontally than the diameter of said coin; means for moving said coin-holding lever away from the pressure-plate laterally to dislodge the coin; and means for forcing the coin out of such engagement as the coin-carrier completes its forward oscillation.

4. In a coin-controlled mechanism, the combination of a shaft capable of oscillatory movement; means for imparting such movement to the shaft; stops to limit the extent of said movement; two parallel side-plates fastened on the shaft, one of which has a coin-slot; a longitudinally slotted coin-plate supported between said side-plates at right angles thereto; a clearer mounted pivotally on said slotted side-plate and having a tripping lever and a toe, the latter of which is movable through the slot of the coin-plate; a fixed cam adapted to engage the tripping lever; and a spring fastened at one end on the coin-plate and resting at its free end on the clearer.

5. In a coin-controlled mechanism, the combination of a shaft capable of a limited oscillation; two parallel side-plates fastened on the shaft, one of which side-plates has a coin-slot; a coin-plate supported by said side-plates; a spring-pressed clearer having a tripping lever and pivotally mounted on the slotted side-piece; and a fixed cam adapted to engage the tripping lever.

6. In a coin-controlled mechanism, the combination of an oscillatory shaft; a coin-carrier fastened on the shaft and provided with a coin-plate; a spring-pressed clearer pivotally mounted on the coin-carrier and capable of an oscillatory movement over the coin-plate; and means for periodically oscillating said clearer.

7. In a coin-controlled mechanism, the combination of an oscillatory shaft; a coin-carrier fastened on the shaft and provided with a coin-plate; a spring-pressed clearer movable over the coin-plate; and means for automatically moving said clearer.

8. In a coin-controlled mechanism, the combination of a shaft capable of limited oscillation; two parallel side-plates fastened on the shaft one of which plates has a cam-edge; a coin-plate supported by said side-plates between the same; means for conducting a coin to the coin-plate; means for temporarily detaining an operative coin of a given diameter in position upon the coin-plate; a fixed front-plate of a cabinet; a receptacle mounted on said front-plate; a conveyer pivotally mounted on said front plate and having a cam-edge with which the cam-edge of said side-plate is adapted to coöperate; a spring arranged to press the upper end of said conveyer; and a curved plate at the lower end of the conveyer adapted to receive from the coin-plate and to deliver into said receptacle any coin passing over the coin-plate which has a diameter less than that of said operative coin.

9. In a coin-controlled mechanism, the combination of an oscillatory shaft; two parallel side-plates fastened on the shaft; a coin-plate supported by the side-plates between the same; means for conducting a coin to the coin-plate; means for temporarily detaining upon the coin-plate an operative coin; a fixed receptacle; a spring-pressed conveyer pivotally mounted on a fixed support and operable by one of said side-plates and provided with a curved plate at its lower end which is adjacent to said receptacle and to said coin-plate, said conveyer being adapted to conduct from the coin-plate to the receptacle any coin which said coin-detaining means cannot engage.

10. In a coin-controlled mechanism, the combination of an oscillatory shaft; a coin-carrier fastened upon the shaft; means for conducting to and through the coin-carrier a coin which is adapted to operate the mechanism; means for temporarily detaining said coin in the coin carrier; and a conveyer adapted to receive and conduct away from the coin-carrier any coin which is not adapted to operate said mechanism.

11. In a coin-controlled mechanism, the combination of an oscillatory shaft; two parallel side-plates fastened upon the shaft and provided with a coin-plate which has a longitudinal slot; a coin-seat; a coin presser lever loosely mounted on the shaft and having a toe which is capable of passing through said slot; a pressure plate on one of the side plates adapted to retain a coin while said coin is pressed by said toe; means for dislodging said coin when the side-plates and coin-presser lever have been partially oscillated, a spring for giving return movement to the coin-presser lever; and a spring for giving return movement to the side-plates and shaft.

12. In a coin-controlled mechanism, the combination of an oscillatory shaft; a coin-carrier fastened upon the shaft; a fixed pressure plate mounted on the coin-carrier and having a projection which is adapted to detain temporarily a coin; a spring-pressed coin-holding device mounted movably on the coin-carrier and adapted to coöperate with said pressure plate for the temporary detention of said coin; means for periodically moving the coin-holding device against the operation of the spring; and a spring-pressed coin-lever mounted loosely on said shaft and provided with means to coöperate with said pressure plate and with said coin-holding device to detain the coin temporarily as aforesaid but to release the coin when the oscillation of the coin-carrier and of the coin-presser lever have been almost completed.

13. In a coin-controlled mechanism, the combination of an oscillatory shaft; a spring-pressed coin-carrier fastened on the shaft and provided with a coin-seat; a spring-pressed coin-presser lever mounted loosely on the shaft; means for detaining a coin temporarily in the coin-seat; and means for dislodging the coin from the coin-seat, the coin-presser lever being returned by its spring to its normal position before the coin-carrier is returned by its spring to its normal position.

14. In a coin-controlled mechanism, the combination of an oscillatory shaft; a cam-plate loosely mounted on the shaft; a feed roller loosely mounted on the shaft; a ratchet wheel fastened upon the end of the feed roller and rotatable therewith and adapted to move a strip of paper; a coin-carrier fastened on the shaft; a cabinet containing said mechanism and having a coin slot through its side in proximity with the coin-carrier; a feed pawl mounted on the coin-carrier and engageable with the ratchet wheel and forced into engagement with the ratchet wheel by said cam-plate; means for oscillating the coin-carrier and shaft; means for oscillating the cam-plate; and devices intermediate said feed roller and coin-carrier adapted to cause the coin-carrier to cover said coin-slot, whenever the paper strip upon the feed roller has been exhausted.

15. In a coin-controlled mechanism, the combination of an oscillatory shaft; a fixed plate having a coin-slot; a spring-pressed coin-carrier fastened on the shaft; a feed roller loosely mounted on the shaft and provided with a ratchet wheel and adapted to move a strip of paper; a feed pawl mounted on the coin-carrier and engageable with the ratchet wheel; a spring-pressed cam-plate loosely mounted on the shaft and adapted to engage the pawl with the ratchet wheel periodically; means for temporarily causing the coin-carrier and cam-plate to oscillate together; means for periodically disconnecting the coin-carrier and cam-plate thereafter, and devices intermediate the feed roller and the coin-carrier operable to cover the coin-slot by the coin-carrier whenever the supply of the paper strip to the feed roller has been exhausted.

16. In a coin-controlled mechanism, the combination of an oscillatory shaft; a fixed plate having a coin-slot; a spring-pressed coin-carrier comprising two parallel side-plates fastened upon the shaft, one of which side plates has a locking notch and also a peripheral recess; a feed pawl mounted on said last named side-plate and provided with a stud at its tail end, which stud normally rests in said recess; a circumferentially grooved feed roller loosely mounted on the shaft and provided with a ratchet wheel, with whose teeth said feed pawl is consecutively engageable, said feed roller being adapted to advance periodically a strip of paper which is wound thereon and which covers the circumferential groove of the roller; a spring-pressed cam-plate loosely mounted on the shaft and adapted to force the feed pawl into engagement with said ratchet wheel; means for temporarily compelling the simultaneous oscillation of the coin-carrier and cam-plate together; means for periodically terminating said simultaneous oscillation; a pivotally mounted lever arm having a toe at its lower end and adapted to rest lightly with its upper end on the paper strip, which covers said groove, but to enter at its upper end into said groove when the paper strip ceases to cover said groove; a spring-pressed locking lever engageable with said locking notch; and a plate mounted on a fixed support, beneath which plate said toe moves freely while the paper strip covers the said groove of the feed roller but which toe comes into abutment with said plate and serves as a stop whenever the supply of the paper strip is exhausted and thus uncovers the said groove of the feed roller, by which stop motion the coin-carrier covers the coin-slot to prevent the locking lever from disengagement with said locking notch.

17. In a coin-controlled mechanism, the combination of an oscillatory shaft; a spring-pressed coin-carrier fastened on said shaft and comprising two parallel side-plates, one of which has a peripheral recess and a locking notch; a feed pawl mounted on the last named side-plate and provided with a stud at its tail end, which stud normally rests in said recess; a circumferentially grooved feed roller loosely mounted on the shaft and provided with a ratchet wheel, with whose teeth said feed pawl is consecutively engageable, said feed roller being adapted to advance periodically a strip of paper which is wound thereon and which covers the circumferential groove of the roller; a spring-pressed coin-lever loosely mounted on said shaft whose forward end is a toe; a coin-plate fastened between the two side-plates and having a longitudinal slot through which slot said toe is movable; a coin-seat upon said coin-carrier adjacent to the slot; a pressure plate on the coin-carrier against which said toe is adapted to press a coin and to detain it temporarily; means for periodically dislodging the coin from the coin-seat; a cam-plate mounted loosely on the shaft and fastened to the coin-presser lever, which cam-plate has cam-edges adapted to engage the feed pawl with the ratchet teeth *seriatim*; a locking lever adapted to engage the locking notch of said side-plate; and devices intermediate the feed roller and coin carrier for preventing the complete return of the coin-carrier whenever the paper strip has been exhausted on the roller but to allow said complete return while the paper strip covers said circumferential groove of the roller, said cam-plate and coin-presser lever being arranged to have their return movement before the coin-carrier has its return movement.

18. In a coin-controlled mechanism, the combination of an oscillatory shaft; a side-plate fastened to the shaft; a pressure plate secured to said side-plate and having a square edge, which is adapted to support temporarily a coin for operating the mechanism; a plate between the side plate and the pressure-plate provided with a prong to underlie the coin on one side thereof, near to but just below the horizontal diameter of said coin; a second side-plate parallel to the first named side-plate and fastened on the shaft; a coin-plate held by and between said two side-plates and provided with a longitudinal slot; a spring-pressed coin-presser lever loosely mounted on the shaft and having a toe which projects through said slot and bears against said coin; a spring-pressed coin-holding lever pivotally mounted on the second named plate and having a beveled coin-seat adapted to coöperate with the said pressure-plate and projection to detain the coin temporarily; and a key movable to a position between the coin-holding lever and the second named side-plate to confine said coin in said place, but movable out of said locking engagement with the coin-holding lever.

19. In a coin-controlled mechanism, the combination of an oscillatory shaft; a coin-carrier fastened on the shaft; a slotted coin-plate upon the coin carrier; a fixed pressure-plate on the coin-carrier having a prong adapted to support a coin for operating the mechanism; a coin-presser lever mounted loosely on the shaft and having a toe extending through the slot of the coin-plate and adapted to bear against said coin; a spring-pressed coin-holding lever pivotally mounted on the coin-carrier and having a curved coin-seat at its free end provided with a beveled surface and adapted to coöperate with said pressure-plate and prong to support said coin temporarily; and a pivotally mounted key lever movable to a position behind the said coin-seat, but capable of being tripped by a fixed stud as the coin-carrier nearly completes its oscillation, so that said key lever is movable thereby to separate from the coin-holding lever.

20. In a coin-controlled mechanism, the combination of an oscillatory shaft; a coin-carrier fastened on the shaft; a coin-plate upon the coin-carrier and provided with a longitudinal slot; a fixed pressure-plate on the coin-carrier having a prong adapted to support a coin for operating the mechanism; a coin-presser lever mounted loosely on the shaft and having a toe extending through the slot of the coin-plate and adapted to bear against said coin; a spring-pressed coin-holding lever pivotally mounted on the coin-carrier and having a cam-edge midway its length and also having at its free end a curved coin-seat provided with a beveled surface and adapted to coöperate with said pressure-plate and prong to support said coin temporarily; a key lever pivotally mounted on the coin-carrier and having a cam-edge midway its length; a spring-pressed conveyer pivotally mounted at its upper end upon a fixed support and provided with a cam-edge to coöperate with the first named cam-edge to force the key lever between the side plate of the coin-carrier and the free end of the coin-holding lever to lock the latter in position; a tripping stud upon a fixed support to push the key lever out of said locking engagement, when the oscillation of the coin-carrier and its connected parts bring the key lever into contact with said stud; and a plate upon the free end of the conveyer adapted as a cam to return the key lever to its normal position.

21. In a coin-controlled mechanism, the combination of an oscillatory shaft; a coin-carrier fastened on the shaft; means for temporarily detaining a coin in the coin carrier; means for thereafter dislodging the coin from said detaining means and turning the coin 90° as it drops from the coin-carrier; and a guide plate to receive and conduct said coin, when it has been so turned.

22. In a coin-controlled mechanism, the combination of a cabinet having a glazed transparent window; a coin-guide mounted adjacent to said window; an oscillatory shaft; a coin-carrier fastened on the shaft; means for temporarily detaining the coin in the coin-carrier; means for thereafter dislodging the coin from said detaining means and turning the coin 90° as it drops from the coin-carrier upon said coin guide, along which the coin rolls past said window.

23. In a coin-controlled mechanism, the combination of a cabinet having a window; a coin-guide adjacent to the window; a coin-carrier adapted to receive a coin and to discharge it upon said guide, and means for imparting a rolling movement to the coin upon the coin-guide.

24. In a coin-controlled mechanism, the combination of a coin-carrier; means for detaining a coin temporarily in the coin-carrier comprising a laterally moving device; and means for periodically moving said device to release said coin.

25. In a coin-controlled mechanism, the combination of a movable coin-carrier, means for detaining a coin temporarily in the coin-carrier, comprising one fixed member and one movable member; and means for periodically operating said movable member.

26. In a coin-controlled mechanism, the combination of a movable coin-carrier; means for detaining a coin temporarily in the coin-carrier comprising a fixed member, and a pivotally mounted member; and means for periodically moving the pivotally mounted member.

27. In a coin-controlled mechanism, the combination of a coin-carrier; means for detaining a coin temporarily in the coin-carrier, comprising a fixed member and a pivotally mounted member which is capable of an oscillatory movement in the plane of its pivot and also of an oscillatory movement in a direction at a right angle with said pivot; and means for periodically moving said pivotally mounted member.

28. In a coin-controlled mechanism, the combination of a coin-carrier; means for detaining a coin temporarily in the coin-carrier, comprising a fixed member and a pivotally-mounted spring-pressed member which is capable of swinging on its pivot and also of an oscillation on its pivot in a plane thereof; means for temporarily locking said pivotally mounted member in locking position; and means for periodically unlocking said pivotally mounted member.

29. In a coin-controlled mechanism, the combination of a coin-carrier; means for detaining a coin temporarily in the coin-carrier, comprising two members parallel to each other at a distance less in length than the diameter of the operative coin, one of which members is fixed in position and the other is movable to increase said distance; means for locking said members in the first named position; and means for unlocking said members.

30. In a coin-controlled mechanism, the combination of a coin-carrier; means for detaining a coin temporarily in the coin-carrier, comprising two members normally parallel to each other, one of which is fixed and one of which is movable and spring-pressed; a locking device normally holding said members in parallelism; and means for moving said locking device out of engagement.

31. In a coin-controlled mechanism, the combination of a movable coin-carrier; means for detaining a coin in the coin-carrier temporarily; a receptacle; and a movable spring-pressed conveyer adapted to receive from the coin-carrier a coin which does not engage with said coin-detaining means and to deliver the said coin to the receptacle.

32. In a coin-controlled mechanism, the combination of a movable coin-carrier; a spring-pressed cam-plate mounted on the coin carrier adapted to move with the coin-carrier only while a coin is in the coin-carrier; a feed pawl mounted on the carrier and operative by the cam plate; and a feed roller having ratchet teeth with which the feed pawl is consecutively engageable.

In testimony whereof I affix my signature in presence of two witnesses.

FRANK J. ROWSE.

Witnesses:
ARTHUR P. JOHNSON,
WARREN R. PERCE.

---

Copies of this patent may be obtained for five cents each, by addressing the "Commissioner of Patents, Washington, D. C."